US005497282A

United States Patent [19]
Hoffmann et al.

[11] Patent Number: 5,497,282
[45] Date of Patent: Mar. 5, 1996

[54] DISK DRIVE SYSTEM HAVING OPEN SLOT SWAGE CONNECTION

[75] Inventors: Thomas M. Hoffmann, Santa Cruz; Victor W. C. Shum, San Jose, both of Calif.

[73] Assignee: International Business Machines Corporation, Armonk, N.Y.

[21] Appl. No.: 173,535

[22] Filed: Dec. 23, 1993

[51] Int. Cl.$^6$ .......................... G11B 21/16; G11B 21/08; G11B 5/49; G11B 5/55
[52] U.S. Cl. .......................................... 360/104; 360/106
[58] Field of Search ....................... 360/104, 106

[56] References Cited

U.S. PATENT DOCUMENTS

| | | | |
|---|---|---|---|
| 4,835,641 | 5/1989 | Maeda | 360/104 |
| 4,912,583 | 3/1990 | Hinlein | 360/104 |
| 4,943,875 | 7/1990 | Reidenbach et al. | 360/104 |
| 5,003,420 | 3/1991 | Hinlein | 360/104 |
| 5,012,367 | 4/1991 | Toensing | 360/104 |
| 5,027,241 | 6/1991 | Hatch et al. | 360/105 |
| 5,063,465 | 11/1991 | Fujioka | 360/104 |
| 5,172,286 | 12/1992 | Jurgenson | 360/104 |
| 5,187,626 | 2/1993 | Hopkins et al. | 360/104 |

FOREIGN PATENT DOCUMENTS

| | | | |
|---|---|---|---|
| 0438806A2 | 7/1991 | European Pat. Off. . | |
| 59-116955 | 7/1984 | Japan . | |
| 60-089880 | 5/1985 | Japan | 360/104 |
| 1-294278 | 11/1989 | Japan . | |
| 2-294977 | 12/1990 | Japan . | |
| 3-176877 | 7/1991 | Japan | 360/104 |
| 4-360081 | 12/1992 | Japan | 360/104 |
| 5-006638 | 1/1993 | Japan | 360/104 |
| 5-307842 | 11/1993 | Japan | 360/104 |

OTHER PUBLICATIONS

IBM Technical Disc. Bulletin vol. 26 No. 3A pp. 1250–1252 Aug. 1983, J. M. Rigotti, "Transducer Suspension Suppressor Clip".

IBM Technical Disc. Bulletin vol. 27 No. 1A pp. 312–313 Jun. 1984, G. G. Gill et al., "Low–Cost Bimetal Suspension Mounting Surface For A Mechanized R/W Suspension Attachment".

IBM Technical Disc. Bulletin vol. 28 No. 6 p. 2492 Nov. 1985, K. A. Krause et al., "Suspension to Arm Attachment With Ramp Plate Structure For Magnetic Recording Head".

IBM Technical Disc. Bulletin vol. 28 No. 6 pp. 2453–2454 Nov. 1985, G. S. Pal, "Rigid Ramp Head Suspension Formed Integrally With Load Beam".

IBM Technical Disc. Bulletin vol. 29 No. 1 pp. 256–257 Jun. 1986, G. S. Pal, "Self–Aligning Suspension To Arm Attachment by Rivets".

IBM Technical Disc. Bulletin vol. 30 No. 11 p. 397 Apr. 1988, B. M. Brue et al., "Head Bar Attachment".

IBM Technical Disc. Bulletin vol. 31 No. 12 pp. 203–204 May 1989, K. H. Elser et al., "Integrated Arm–Head Suspension For Magnetic Disk Files".

(List continued on next page.)

*Primary Examiner*—John H. Wolff
*Assistant Examiner*—Craig A. Renner
*Attorney, Agent, or Firm*—Douglas R. Millett; Max Ciccarelli; Andrew J. Dillon

[57] ABSTRACT

The disk drive system has rotatably mounted spaced apart magnetic disks, a disk motor for rotating the disks, an actuator hub, a motor for rotating the actuator hub, and a control circuit for controlling the disk motor and the actuator hub motor to permit selective positioning of read/write heads over the disks. The actuator hub has an actuator arm extending radially therefrom. The actuator arm has an open slot located on the perimeter of the actuator arm. A head gimbal assembly for mounting the read/write heads to the actuator arm has a boss located on a proximal end of the head gimbal assembly. The boss registers with the open slot and is sized such that when the boss is swaged while within the open slot an outer surface of the boss expands into an inner surface of the open slot so that the spud and the open slot keep the head gimbal assembly fixedly attached to the actuator arm.

4 Claims, 7 Drawing Sheets

OTHER PUBLICATIONS

IBM Technical Disc. Bulletin vol. 31 No. 10 pp. 395–396 Mar. 1989, W. W. Brooks, Jr. et al., "High Performance Plastic Arm For Hard File Actuator Head/Suspension Assembly".

IBM Technical Disc. Bulletin vol. 32 No. 8A pp. 71–72 Jan. 1990, G. D. Malagrino, Jr., "Head Suspension Assembly Snap–In Mount (For Current Swage Mount)".

IBM Technical Disc. Bulletin vol. 32 No. 8B p. 174 Jan. 1990, W. W. Brooks et al., "Clad Metal Hard File Arm".

IBM Technical Disc. Bulletin vol. 33 No. 3A pp. 252–257 Aug. 1990, M. Barenboim et al., "Assembly Fixture For Magnetic Read/Write Head Suspension Assemblies".

IBM Technical Disc. Bulletin vol. 34 No. 8 pp. 254–256 Jan. 1992, M. Barenboim et al., "Corsair Comb Load Workstation".

IBM Technical Disc. Bulletin vol. 34 No. 8 pp. 467–469 Jan. 1992, W. K. Anderson et al., "Head Suspension Assembly Magazine".

IBM Research Disc. TDB No. 247 p. 46 Nov. 1984, W. E. Steele, "Suspension Attachment By Hollow Rivets".

DISK DRIVE SYSTEM HAVING OPEN SLOT SWAGE CONNECTION

BACKGROUND OF THE INVENTION

1. Technical Field

The present invention relates in general to improvements in disk drive systems and in particular to swage connections for connecting head gimbal assemblies to actuator arms in a disk drive system.

2. Description of the Related Art

It has been a continuing objective of the disk drive industry to produce disk drive systems of increasing storage capacity, decreased size (or "form factor" as often used in the industry), and faster response time. One approach to increasing the storage capacity of a disk drive is to increase the number of disks. However, as the number of disks increases, the height of the disk drive also increases. To maintain the desired form factor of the disk drive, workers in the art are continually trying to reduce the spacing between disks.

While trying to reduce the spacing between disks, workers in the art are also trying to reduce the mass of the actuator and head gimbal assembly so as to decrease the response time of the disk drive. One way of reducing the mass of the head gimbal assembly is to bring the actuator hub closer to the center of the disk stack. This results in shorter, and thus lighter, head gimbal assemblies, and also in a disk drive having a smaller foot print.

Although one way to achieve the smallest possible spacing between the actuator hub and the center of the disk stack is for the actuator arms to fit between the disks, fitting the actuator arms between the disks limits the minimum spacing between disks since additional space must be left between the disks to allow for the actuator arm thickness and for the connection between the actuator arm and the head gimbal assembly. Therefore, in designing disk drives with form factors having a very small height, the actuator arms and swage connections are kept outside the disk stack to permit closer spacing of the disks. Workers in the art are continuously trying to bring the actuator hub as close as possible to the disk stack, while still keeping the actuator arms and swage connections outside the disk stack.

To bring the actuator hub as close as possible to the disk stack, while maintaining the actuator arms outside the disk stack, the actuator arms must be made as short as possible, and a suitable method of connecting the head gimbal assemblies to the actuator arms is needed. In the prior art, swage connections are often used to connect head gimbal assemblies to actuator arms. Swage connections are popular because they make assembly of the head gimbal assemblies onto the actuator arms particularly easy.

Prior art swage connections use a hole in the actuator arm and a boss on the member to be attached to the actuator arm. The boss is sized so that it fits inside the actuator arm hole. There is a boss hole through the boss, and a lip on the inside diameter of the boss hole. A hard ball is passed through the boss hole thus enlarging the boss and forcing the outside surface of the boss into the inside surface of the actuator arm hole. This swaging process causes the outside surface of the boss to "bite" into the inside surface of the actuator arm hole, thus causing the member to be fixedly connected to the actuator arm.

Figure 7:
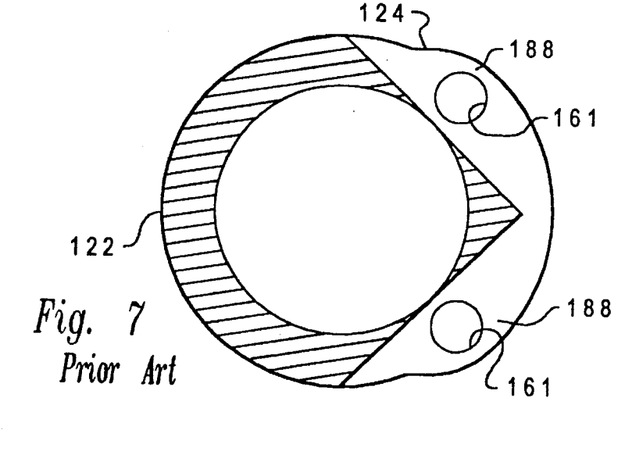
FIG. 7 is a cross sectional view of a prior art actuator hub taken along a line similar to line 5—5 of FIG. 6.

Both one-boss and multiple-boss swage connections are known in the art. However, prior art swage connections use a hole on the actuator arm that has material around 360 degrees of the hole. FIG. 7 shows a prior art actuator hub 122. Actuator hub 122 of FIG. 7 shows that the holes 161 in actuator arm 124 are completely surrounded by material, such as the material indicated by reference numerals 188.

SUMMARY OF THE INVENTION

It is therefore an object of the present invention to provide an improved disk drive system.

It is another object of the present invention to provide an improved disk drive having a swage connection that permits closer spacing between the actuator hub and the disk stack, resulting in a disk drive having a smaller form factor.

It is another object of the present invention to provide an improved disk drive having a swage connection that permits closer spacing between the disks.

It is another object of the present invention to provide an improved disk drive having an actuator and head gimbal assembly having reduced mass so as to decrease the response time of the disk drive.

The foregoing objects are achieved as is now described. The disk drive system has rotatably mounted spaced apart magnetic disks, a disk motor for rotating the disks, an actuator hub, rotating means for rotating the actuator hub, and a control circuit for controlling the disk motor and the actuator hub to permit selective positioning of read/write heads over the disks. The actuator hub has an actuator arm extending radially therefrom. The actuator arm has an open slot located on the perimeter of the actuator arm. A head gimbal assembly for mounting the read/write heads to the actuator arm has a boss located on a proximal end of the head gimbal assembly. The boss registers with the open slot and is sized such that when the boss is swaged while within the open slot an outer surface of the boss expands into an inner surface of the open slot so that the boss and the open slot keep the head gimbal assembly fixedly attached to the actuator arm.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
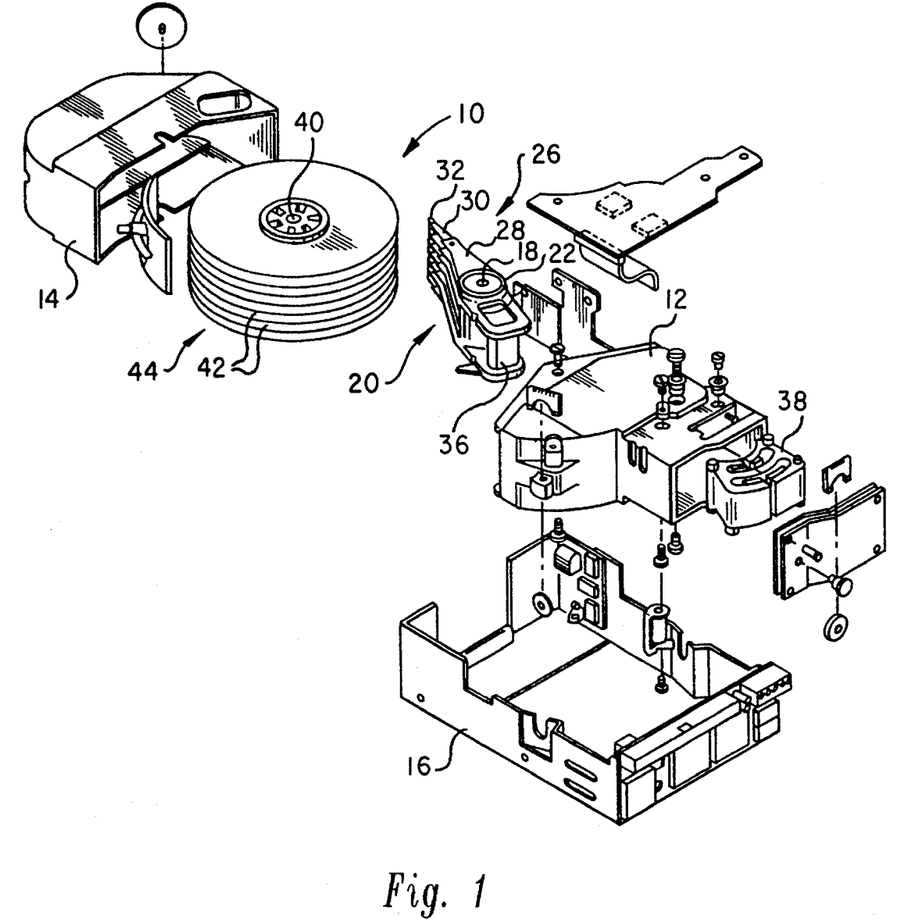
FIG. 1 is an exploded view of a representative disk drive system.

With reference now to the figures and in particular with reference to FIG. 1, there is depicted an exploded view of a typical disk drive system or disk drive 10. It should be noted that although a rotary actuator is shown, the invention described herein is applicable to linear actuators. The disk drive 10 includes a housing 12, and a housing cover 14 which, after assembly, is mounted within a frame 16. Rotatably attached within the housing 12 on an actuator shaft 18 is an actuator assembly 20. One end of the actuator assembly 20 includes an E block or actuator hub 22 having a plurality of radially extending actuator arms 24 (hidden from view in FIG. 1 and better shown in FIG. 2). Attached to the separate actuator arms 24 of hub 22 are head gimbal assemblies 26. Each head gimbal assembly 26 includes a mounting plate 28 attached to actuator arm 24. Attached to the end of mounting plate 28 are one or two load beams 30. Attached at the end of each load beam 30 is a slider 32 which carries a pair of magnetic transducers or read/write head 34 (shown in FIG. 3). On the other end of the actuator assembly 20, opposite the load beams 30 and the sliders 32, is a rotating means for rotating hub 22. The rotating means is shown as a voice coil 36, attached to actuator hub 22, and magnets 38, attached within housing 12. Magnets 38 and the voice coil 36 are the key parts of a voice coil motor which applies a force to the actuator assembly 20 to rotate it about the actuator shaft 18.

Also mounted within housing 12 is a spindle shaft 40. Rotatably attached to spindle shaft 40 are a number of vertically spaced apart magnetic disks 42. The vertically spaced apart and aligned magnetic disks 42 define a disk stack 44. An internal disk motor (not shown) rotates the disks 42. Disk drive 10 also has control circuitry for controlling the disk motor and the voice coil motor to allow selective positioning of read/write heads 34 over disks 42.

Figure 2:
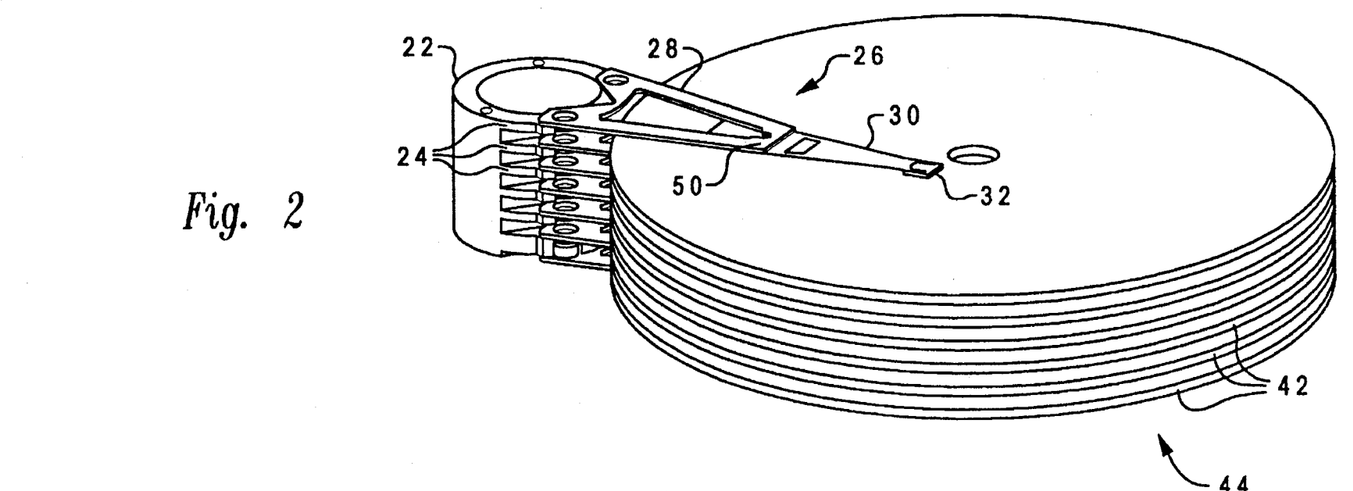
FIG. 2 is a perspective view of an actuator hub and head gimbal assemblies of the present invention.
Figure 3:
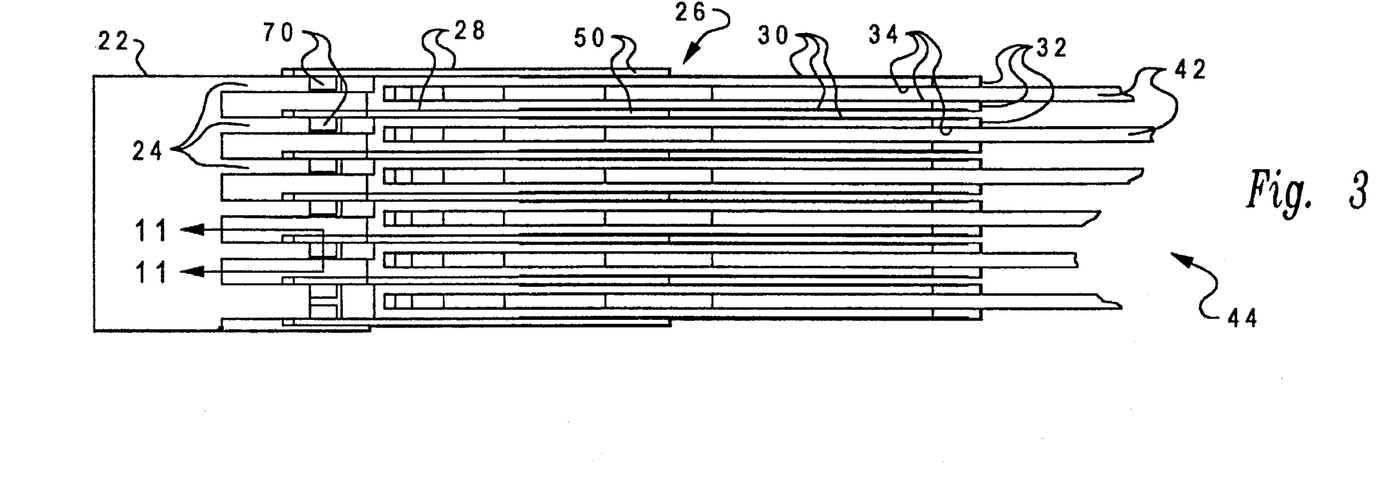
FIG. 3 is a side view of the actuator hub and head gimbal assemblies of FIG. 2.

FIG. 2 details part of the actuator assembly for use with the present invention. In particular, it shows hub 22 with seven head gimbal assemblies 26 attached thereto. FIG. 3 is a side view of the actuator assembly shown in FIG. 2, and better shows some of the aspects of the present invention. Referring now mainly to FIGS. 2 and 3, each head gimbal assembly 26 comprises a mounting plate 28 for supporting one or two load beams 30. The uppermost and lowermost head gimbal assemblies are single-head gimbal assemblies and have only one load beam 30 and one read/write head 34. The remainder of the head gimbal assemblies are double-head gimbal assemblies and have two load beams 30 and two read/write heads 34, one read/write head 34 communicating with a lower surface of one disk, and the other read/write head 34 communicating with an upper surface of another disk. The load beams 30 are attached to distal ends 50 of mounting plates 28. Mounted to each load beam 30 is a slider 32. Each slider 32 supports a read/write head 34 attached to a diskward surface of slider 32. Load beams 30 are resiliently flexible in the vertical direction to allow slider 32 to follow the topography of disks 42, and are rigid in the in-plane directions for precise slider positioning. Although not shown, a flexure is usually used to mount slider 32 to load beam 30.

Figure 4:
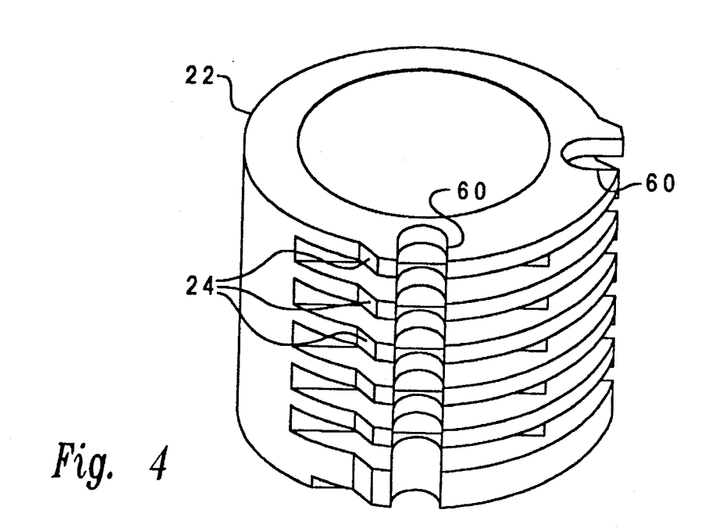
FIG. 4 is a perspective view of an actuator hub of the present invention.
Figure 5:
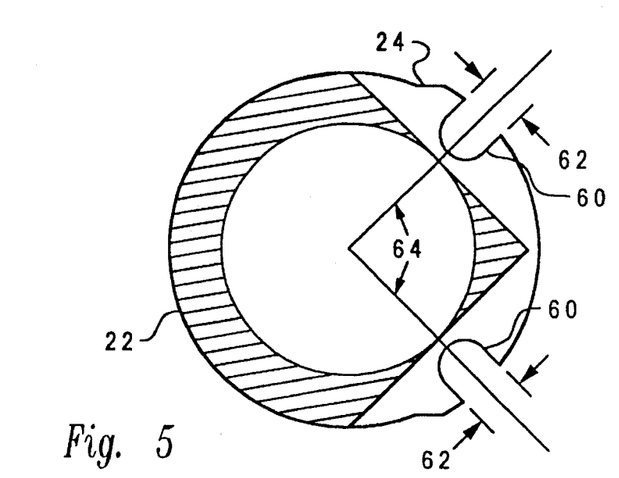
FIG. 5 is a cross sectional view of the actuator hub of FIG. 4 taken along line 5—5 of FIG. 6.
Figure 6:
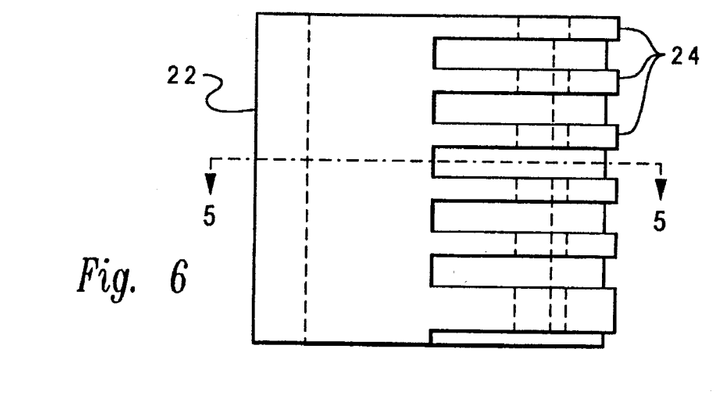
FIG. 6 is a side view of the actuator hub of FIG. 4.

Head gimbal assemblies 26 are attached to actuator hub 22 by means of a novel swage connection. FIG. 4 shows a perspective view of an actuator hub of the present invention. FIG. 5 shows a cross sectional view of the actuator hub of FIG. 4 taken along line 5—5 of FIG. 6. FIG. 6 shows a side view of the actuator hub of FIG. 4. Referring now mainly to FIGS. 4, 5, and 6, actuator hub 22 has actuator arms 24 extending radially therefrom. On the perimeter of each actuator arm 24 are a pair of open slots 60 having an opening 62. Slots 60 differ from the prior art holes in that they do not have material all the way around the perimeter of slots 60. The slots 60 are oriented such that slots 60 are angled away from each other by an angle 64. FIGS. 4–6 show angle 64 to be approximately 90°, however, other 1 angles can be used depending on the physical constraints of the disk drive and the amount of force the swage connection must withstand.

Figure 8:
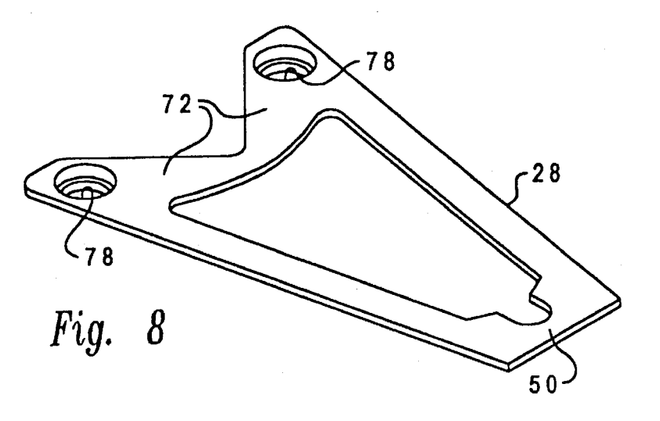
FIG. 8 is a perspective view of a mounting plate for use with the present invention.
Figure 9:
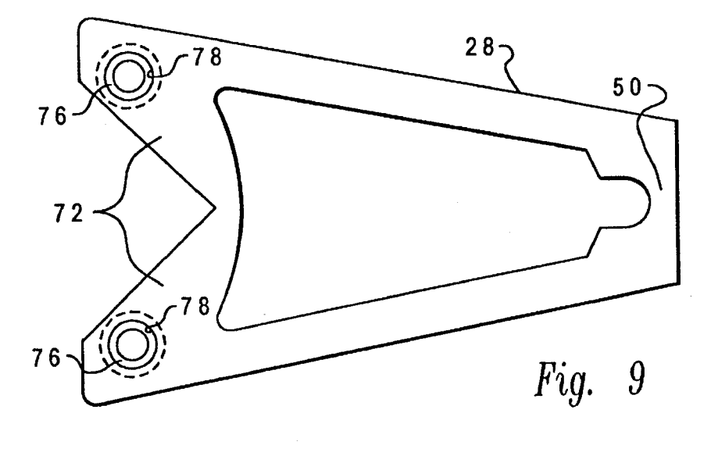
FIG. 9 is a top view of the mounting plate of FIG. 8.
Figure 10:
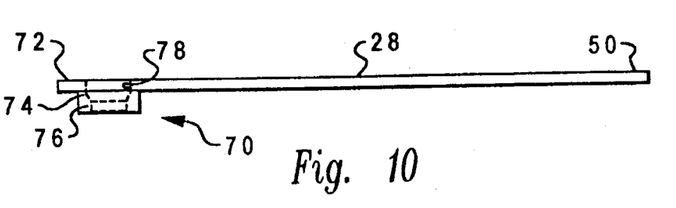
FIG. 10 is a side view of the mounting plate of FIG. 8.
Figure 11:
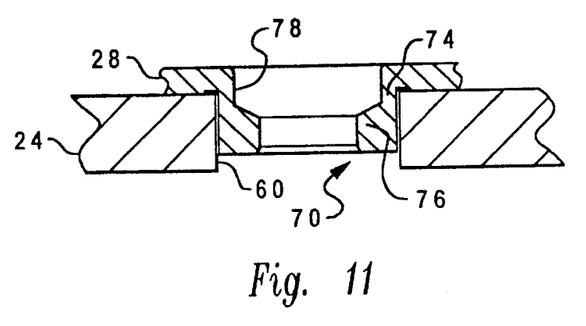
FIG. 11 is a cross sectional view of a boss and actuator arm of the present invention, shown prior to the boss being swaged, taken along line 11—11 of FIG. 3.
Figure 12:
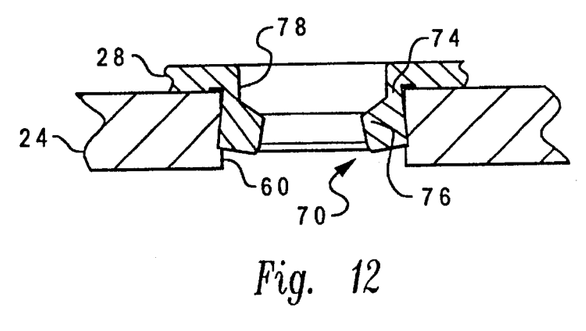
FIG. 12 is a cross sectional view of a boss and actuator arm of the present invention, shown after the boss is swaged, taken along line 11—11 of FIG. 3.

FIG. 8 shows a perspective view of a mounting plate 28 for use with the present invention. FIG. 9 is a top view of mounting plate 28 of FIG. 8. FIG. 10 is a side view of mounting plate 28 of FIG. 8. Referring now mainly to FIGS. 8, 9, and 10, mounting plate 28 has a boss 70 protruding from a proximal end 72 of mounting plate 28. Boss 70 has a cylinder 74 sized such that it fits inside slot 60. Cylinder 74 has a lip 76 protruding inwardly from an inside diameter of cylinder 74. Boss 70 is placed inside slot 60. FIG. 11 shows a cross sectional view of boss 70 and slot 60 taken along line 11 of FIG. 3, shown before boss 70 is swaged into slot 60. FIG. 12 shows the same cross sectional view of FIG. 11, but shown after boss 70 is swaged into slot 60. Referring now mainly to FIGS. 11 and 12, after bosses 70 are placed in slots 60, a hard ball is passed through the boss hole 78 located in cylinder 74 of boss 70. The ball (not shown) is sized such that in passing through boss hole 78, it deflects lip 76 outwardly. The outward deflection of lip 76 forces the outer surface of cylinder 74 outward and into the inside surface of slot 60. This causes boss 70 to "bite" into slot 60 thereby fixedly attaching mounting plate 28, and hence head gimbal assembly 26, to actuator arm 24.

The angle 64 between the two slots 60 of the embodiment of FIGS. 4–6 prevents bosses 70 from moving out of slots 60 during the swaging process and during operation. If a swage attachment used only one of slots 60 of FIG. 5, when boss 70 is swaged by passing the hard ball through boss hole 78, the expansion of cylinder 74 of boss 70 would force boss 70 out of slot 60 because of no material restriction in the direction of the open portion of slot 60. Furthermore, even if boss 70 remains inside slot 60, the connection between boss 70 and slot 60 would not be very strong in the direction of slot 60. As stated above, the present invention uses two slots 60 that are angled away from each other by an angle 64. With such a configuration, when bosses 70 are swaged into slots 60, as each boss 70 tends to move out of its own slot 60, that boss 60 will also tend to pull the other boss 70 into its respective slot 60. These counterbalancing forces acting on bosses 70 tend to keep bosses 70 within slots 60, thereby fixedly coupling head gimbal assembly 26 to actuator arm 24.

Figure 13A:
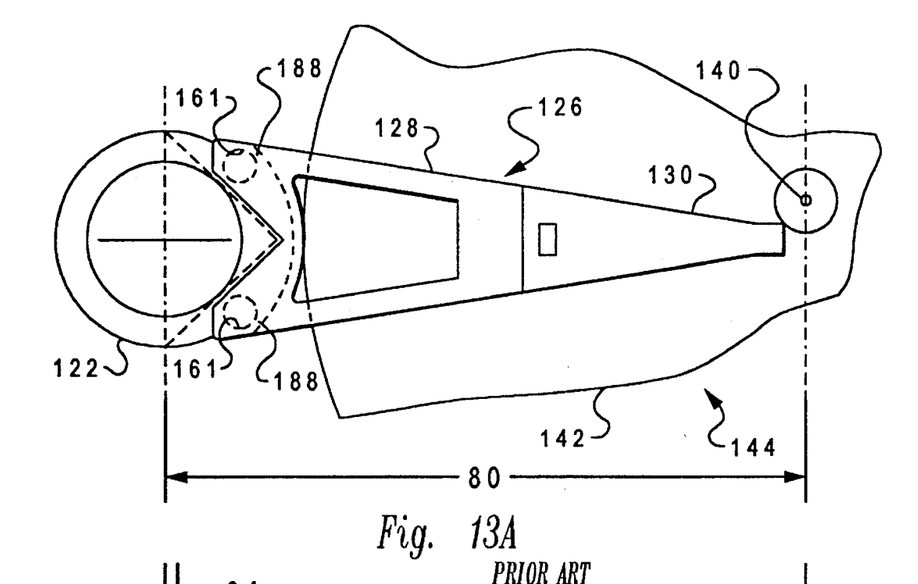
FIG. 13A is a top view of the prior art actuator hub of FIG. 7 shown with a head gimbal assembly attached thereto and shown next to a disk stack.
Figure 13B:
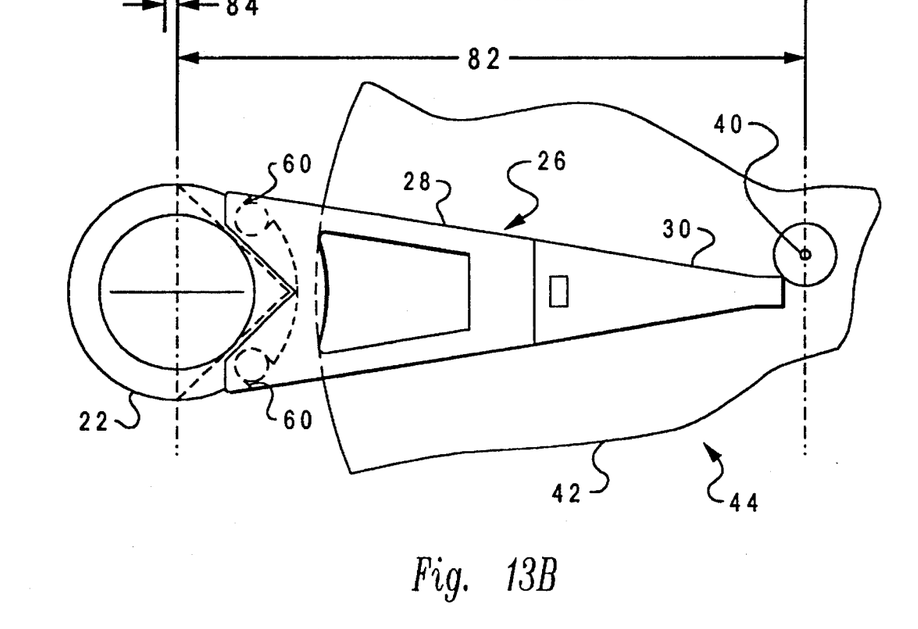
FIG. 13B is a top view of the actuator hub of FIG. 5 shown with a head gimbal assembly attached thereto and shown next to a disk stack.

FIGS. 13A and 13B show how the swage connection of the present invention allows actuator hub 22 to be located closer to disk stack 44 than the prior art swage connections. FIG. 13A shows a top view of the prior art actuator hub 122 of FIG. 7 shown with a head gimbal assembly 126, comprising mounting plate 128 and load beam 130, attached thereto and shown in its finally assembled position next to a disk stack 144 comprising disks 142 arranged on spindle shaft 140. Spacing 80 is the distance between the center of hub 122 and the center of disk stack 142. FIG. 13B shows a top view of the actuator hub 22 of the present invention as shown in FIG. 5, shown with a head gimbal assembly 26 attached thereto and shown in its finally assembled position next to a disk stack 44 made up of disks 42. Spacing 82 is the distance between the center of hub 22 and the center of disk stack 44. As FIGS. 13A and 13B illustrate, spacing 82 is smaller than spacing 80 by distance 84. The smaller spacing 82 permits the use of a shorter, and thus lighter head gimbal assembly 26. Also, the novel actuator hub 22 of FIGS. 5 and 13B weighs less than the prior art actuator hub 122 of FIGS. 7 and 13A because hub 22 of FIGS. 5 and 13B does not have the excess material 188 on the outside of holes 161 as does actuator hub 122 of FIGS. 7 and 13A.

Referring now mainly to FIG. 3, it is shown how the present invention permits a smaller spacing between disks 42. By locating the swage connections and actuator arms 24 outside of disk stack 44, disks 42 can be spaced closed together since the spacing between the disks does not have to accommodate the thicknesses of the swage connections and the thickness of actuator arms 24. Although placing the swage connections and actuator arms 24 outside disk stack 44 is detrimental in that it increases the footprint of disk drive 10 and increases the weight of head gimbal assemblies 26, it allows tighter disk spacing and is thus advantageous. Furthermore, the novel swage connection of this invention minimizes the disadvantages of having the swage connections and arms 24 outside disk stack 44 by permitting the smallest possible spacing between hub 22 and disks stack 44.

Figure 14:
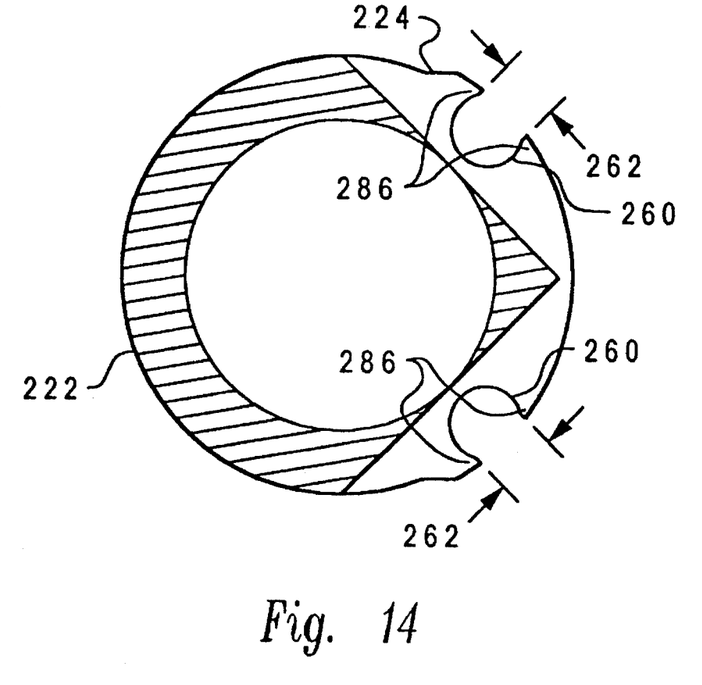
FIG. 14 is a cross sectional view of an alternative embodiment of the hub of the present invention taken along a line similar to line 5—5 of FIG. 6.

The embodiment shown in FIGS. 4–6 is only one of the many possible embodiments of the present invention. The "open slot" design can take on various other forms. An example is shown in FIG. 14, which shows a cross sectional view of an actuator hub 222 having an actuator arm 224, which is an embodiment of an actuator hub for use with the present invention. The slots 260 in FIG. 14 are similar to slots 60 of FIG. 5 except that slots 260 of FIG. 14 have openings 262 that are smaller than the outside diameters of bosses 70 of head gimbal assemblies 26. The protrusions 286 of material that form the reduced opening 262 help to keep boss 70 inside slot 260 and help to make a stronger connection between boss 70 and slot 260. A further advantage of the design of slots 260 of FIG. 14 is that they can be used in a single-boss design, that is in a design in which each actuator arm only has one slot 260 and each head gimbal assembly only has one boss 70. The protrusions 286 prevent boss 70 from being forced out of slot 260 during swaging and during operation, thereby eliminating the need to have two angled slots.

Figure 15:
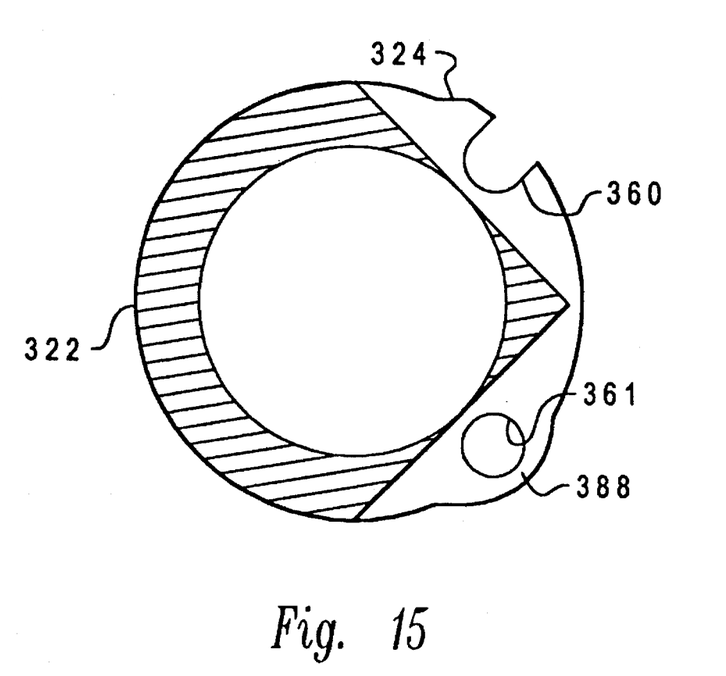
FIG. 15 is a cross sectional view of another alternative embodiment of the hub of the present invention taken along a line similar to line 5—5 of FIG. 6.
Figure 16A:
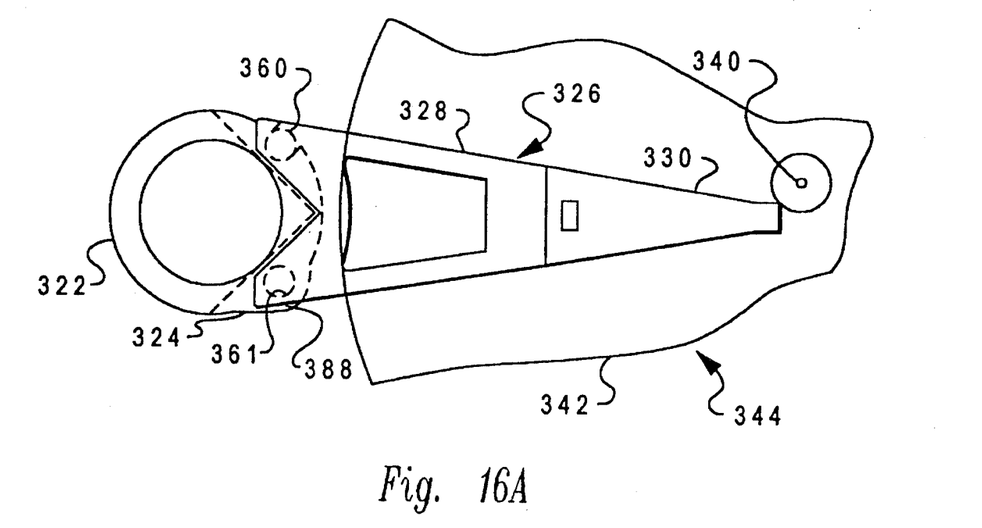
FIG. 16A is a top view of the actuator hub of FIG. 15 shown with a head gimbal assembly attached thereto and shown next to a disk stack.
Figure 16B:
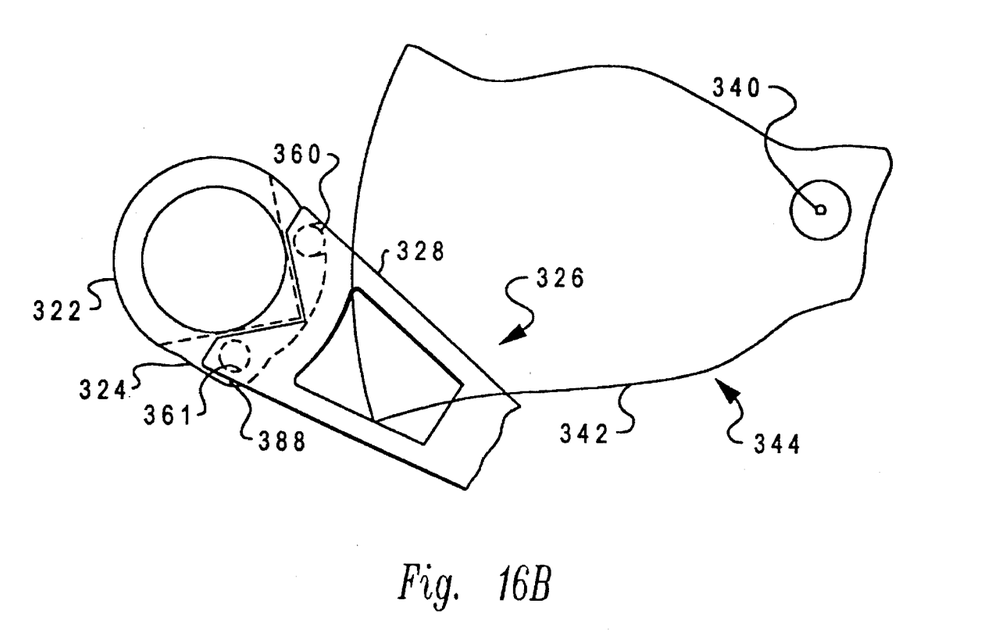
FIG. 16B is a top view of the actuator hub, head gimbal assembly, and disk stack of FIG. 16A, but shown with the actuator hub in a rotated position.

Another example of a different embodiment of the present invention is shown in FIG. 15. FIG. 15 shows an actuator hub 322 having an actuator arm 324 and using both a slot 360 and a hole 361 FIGS 16A–16B show the hub 322 of FIG. 15 connected to a head gimbal assembly 326 comprising a mounting plate 328 and load beam 330. The hub 322 is shown in its operational position next to disk stack 344 comprising disks 342 and spindle shaft 340. This configuration still permits the closer spacing of the hub to the disk stack but provides the additional strength of the swage connection made through a hole such as hole 361. The closer spacing is still possible because, since actuator hub 322 rotates only between the two positions shown in FIGS. 16A and 16B, the material 388 around hole 361 does not interfere with disk stack 344. On the other hand, slot 360 rotates to a position very close to disk stack 344 and must therefore permit minimum spacing, which a slot such as slot 360 permits, as discussed above.

While the invention has been particularly shown and described with reference to a preferred embodiment, it will be understood by those skilled in the art that various changes in form and detail may be made therein without departing from the spirit and scope of the invention.

We claim:

1. A swage connection connecting a member to an actuator arm in a disk drive system, the swage connection comprising:

a first open slot located on a perimeter of said actuator arm, said first open slot passing through upper end lower surfaces of said actuator arm and extending into the actuator arm from a periphery thereof;

a boss located on a proximal end of said member for registering with said open slot;

said boss swaged within said first open slot with an outer surface of said boss expanded into an inner surface of said first open slot; and said first open slot in said actuator arm having an opening that is smaller than a diameter of said boss.

2. A swage connection connecting a member to an actuator arm in a disk drive system, the swoon connection comprising:

a first open slot located on a perimeter of said actuator arm, said first open slot passing through upper and lower surfaces of said actuator arm and extending into the actuator arm from a periphery thereof;

a boss located on a proximal end of said member for registering with said open slot;

said boss swaged within said first open slot with an outer surface of said boss expanded into an inner surface of said first open slot;

a second open slot located on said perimeter of said actuator arm, said second open slot passing through said upper and lower surfaces of said actuator arm and extending into the actuator arm from said periphery thereof;

a second boss located on said proximal end of said member for registering with said second open slot;

said second boss swaged within said second open slot with an outer surface of said second boss expanded into an inner surface of said second open slot; and said first open slot and said second open slot being angled away from each other, wherein said member is fixedly attached to said actuator arm.

3. A disk drive system comprising:

rotatably mounted, vertically spaced apart magnetic disks, a disk motor for rotating said rotatably mounted, vertically spaced apart magnetic disks, an actuator hub, actuator hub motor, a control circuit for controlling said disk motor and said actuator hub motor to allow selective positioning of read/write heads over said rotatably mounted, vertically spaced apart magnetic disks;

an actuator arm extending radially from said actuator hub:

a first open slot located on a perimeter of said actuator arm, said first open slot passing through upper and lower surfaces of said actuator arm and extending into the actuator arm from a periphery thereof;

a member for mounting said read/write heads to said actuator arm;

a boss located on a proximal end of said member for registering with said first open slot;

said boss swaged within said first open slot with an outer surface of said boss expanded into an inner surface of said first open slot, wherein said boss and said first open slot keep said member fixedly attached to said actuator arm; and said first open slot in said actuator arm having an opening that is smaller than a diameter of said boss.

4. A disk drive system comprising;

rotatably mounted, vertically spaced apart magnetic disks, a disk motor for rotating said rotatably mounted, vertically spaced apart magnetic disks, an actuator hub, actuator hub motor, a control circuit for controlling said disk motor and said actuator hub motor to allow selective positioning of read/write heads over said rotatably mounted, vertically spaced apart magnetic disks;

an actuator arm extending radially from said actuator hub;

a first open slot located on a perimeter of said actuator arm, said first open slot passing through upper and lower surfaces of said actuator arm and extending into the actuator arm from a periphery thereof;

a member for mounting said read/write heads to said actuator arm;

a boss located on a proximal end of said member for registering with said first open slot;

said boss swaged within said first open slot with an outer surface of said boss expanded into an inner surface of said first open slot;

a second open slot located on said perimeter of said actuator arm, said second open slot passing through said upper and lower surfaces of said actuator arm and extending into the actuator arm from said periphery thereof;

a second boss located on said proximal end of said member for registering with said second open slot;

said second boss swaged within said second open slot with an outer surface of said second boss expanded into an inner surface of said second open slot; and said first open slot and said second open slot being angled away from each other, wherein said member is fixedly attached to said actuator arm.

\* \* \* \* \*

UNITED STATES PATENT AND TRADEMARK OFFICE
CERTIFICATE OF CORRECTION

PATENT NO. : 5,497,282
DATED : March 5, 1996
INVENTOR(S) : Hoffmann et al.

It is certified that error appears in the above-indentified patent and that said Letters Patent is hereby corrected as shown below:

In the Abstract, in the third line from the end: change "spud" to --boss--

Column 4, line 38: delete "1" between "other" and "angles"

Column 5, line 11: change the second occurrence of "60" to --70--

Column 6, line 11: change "a hole 360" to --a hole 360.--

UNITED STATES PATENT AND TRADEMARK OFFICE
CERTIFICATE OF CORRECTION

PATENT NO.  : 5,497,282
DATED       : March 5, 1996
INVENTOR(S) : Hoffmann et al.

It is certified that error appears in the above-indentified patent and that said Letters Patent is hereby corrected as shown below:

IN THE CLAIMS

Claim 1, Column 6, line 46, delete "swoon", insert --swage--.

Signed and Sealed this

Sixth Day of August, 1996

*Attest:*

BRUCE LEHMAN

*Attesting Officer*     *Commissioner of Patents and Trademarks*